United States Patent [19]

Emmett

[11] Patent Number: 4,588,559

[45] Date of Patent: May 13, 1986

[54] LIME SLAKING SYSTEM INCLUDING A CYCLONE AND CLASSIFIER FOR SEPARATING CALCIUM HYDROXIDE AND GRIT PARTICLES FROM A SLURRY THEREOF

[75] Inventor: Robert C. Emmett, Salt Lake City, Utah

[73] Assignee: Envirotech Corporation, Salt Lake City, Utah

[21] Appl. No.: 655,390

[22] Filed: Sep. 27, 1984

Related U.S. Application Data

[62] Division of Ser. No. 456,923, Jan. 10, 1983, Pat. No. 4,482,528.

[51] Int. Cl.$^4$ .............................................. C04B 2/04
[52] U.S. Cl. .................................... 422/162; 422/232; 209/3; 209/18; 209/172.5
[58] Field of Search ....................... 422/162, 225, 232; 423/640; 209/3, 13, 18, 172.5, 210

[56] References Cited

U.S. PATENT DOCUMENTS

| | | | |
|---|---|---|---|
| 2,833,626 | 5/1958 | Knibbs et al. | 422/162 |
| 3,839,551 | 10/1974 | Dozsh et al. | 423/640 |
| 3,928,182 | 12/1975 | Eder | 209/18 |
| 4,261,953 | 4/1981 | Gisler | 422/162 |

FOREIGN PATENT DOCUMENTS

| | | | |
|---|---|---|---|
| 2343924 | 3/1974 | Fed. Rep. of Germany | 209/18 |
| 2714858 | 10/1978 | Fed. Rep. of Germany | 423/640 |
| 1604782 | 3/1972 | France | 209/211 |
| 32470 | 3/1978 | Japan | 209/211 |
| 910895 | 11/1962 | United Kingdom | 422/162 |
| 886997 | 12/1981 | U.S.S.R. | 209/211 |

Primary Examiner—David L. Lacey
Attorney, Agent, or Firm—Thomas S. MacDonald; Alan H. MacPherson; Carl Rowold

[57] ABSTRACT

A lime slaking system for hydration of lime and removal of unwanted grit, particularly for formation of reactive slaked lime to be used in SO$_2$ scrubbing of effluent gases, comprising a series of slaking vessels (10, 12) for reacting CaO and water while agitating the reactants, a dilution mix tank (14) receiving a viscous slaked lime slurry from the vessels, diluent for the dilution tank comprising an upstream classifier overflow stream (16), a cyclone (19) receiving pumped diluted slurry from tank (14), the overflow (21) of the cyclone providing usable slaked lime product and the underflow (22) exiting to the upstream classifier (24) where grit materials are separated and removed. Dilution for effective classification is provided by spent scrubbing process water containing appreciable sulfate ions. Detention time is such in the classifier (24) along with presence of a prescribed amount of slaked lime exiting the cyclone underflow (22), to allow precipitation of the sulfate ion as gypsum in the classifier (24) to prevent scaling in the gas scrubbing equipment. Optionally an attrition machine (30) may be incorporated along with a subsequent classifier (32) to recover any occluded slaked lime particles reporting with the grit discharge (27) from classifier (24).

8 Claims, 1 Drawing Figure

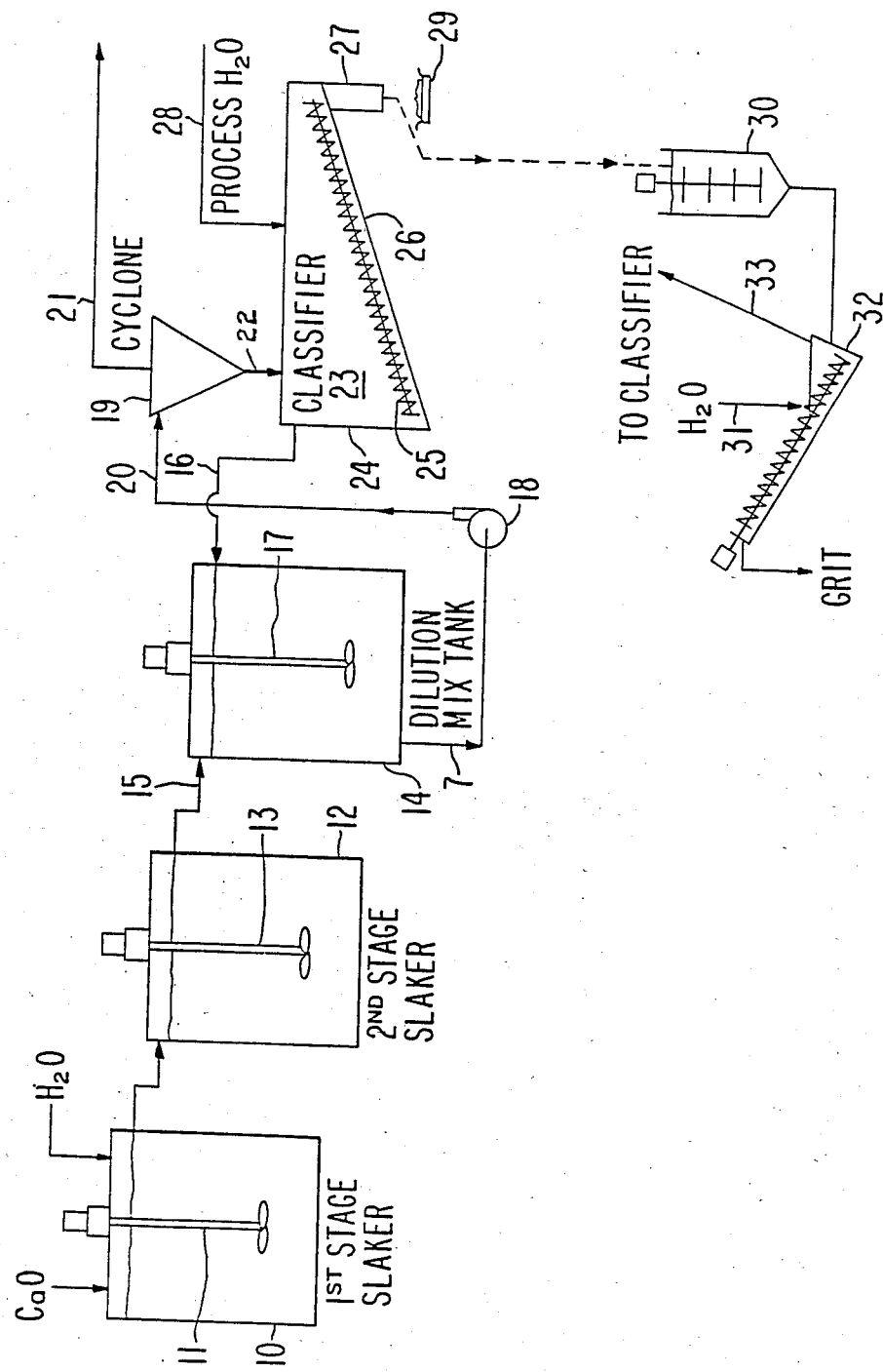

LIME SLAKING SYSTEM INCLUDING A CYCLONE AND CLASSIFIER FOR SEPARATING CALCIUM HYDROXIDE AND GRIT PARTICLES FROM A SLURRY THEREOF

This application is a divisional application of U.S. application Ser. No. 456,923, filed Oct. 10, 1983, now U.S. Pat. No. 4,482,528.

BACKGROUND OF THE INVENTION

1. Field of the Invention

This invention relates to a lime slaking and grit removal process and system particularly useful in preparation of slaked lime for power plant effluent gas scrubbing. When hydrated lime is to be used as a gas scrubbant, a commercial lime product (calcium oxide) is purchased and slaked (to $Ca(OH)_2$) immediately prior to use. Because of the quantity of slaked lime needed for large scrubbing installations and the needed activity characteristics of such slaked lime, i.e. it is to be highly reactive with $SO_2$, a very high recovery of slaked lime is necessary in the process along with good removal of grit in order to reduce abrasion in the scrubbing equipment. While the slaked lime is primarily usable in association with $SO_2$ gas effluent scrubbing, the process and system may be utilized to prepare slaked lime for other applications.

2. Prior Art

A system representative of the prior art is seen in U.S. Pat. No. 2,086,379 (Clark) which shows the use of lime and water in a lime mix vessel wherein a portion of absorption liquor (from treatment of gas mixtures) containing absorbed $SO_2$, and neutral salts of sulfuric acid are admitted to precipitate gypsum crystals, which are then removed by filtration. Subsequently the neutral salts are precipitated in a second vessel, treated with acid liquor and lime and the resultant liquor returned for use in the gas absorption system. Clark, however, does no lime slaking.

U.S. Pat. No. 3,170,770 (Bousman et al.), assigned to applicant's assignee predecessor company, is representative of a lime slaking apparatus, wherein lime and water are reacted in various compartments, the lime particles rabbled and raked over various surfaces and unreacted solids including grit removed by a classifier screw. Lime slaking occurs rapidly on the lime particle surfaces with rapid disintegration of reacted material, resulting in a milk of lime suspension. Use of the above apparatus with highly reactive lime, however, results in a viscous slurry of 10-20% solid concentration in which separation and removal of small grit of +10 to +100 mesh size is difficult. Primarily, the waste material conveyed upwardly and outwardly by the spiral are of a greater size than the +10 to +100 mesh material.

U.S. Pat. No. 2,904,401 (Booth) describes a method and apparatus for hydrating (or slaking) of lime which recognizes the presence of unwanted materials including grit, sand, stones, etc. and involves the formation of a thick "paste" product rather than the conventional more dilute slurry. Booth recites that by using less diluent, 2 pounds of water per pound of lime, that there is greater efficiency in utilization of power applied to the agitating means to break-up the lime lumps fed to the apparatus. Booth further incorporates a dilution chamber for diluting the formed paste with water so that a dilute suspension may be formed as may be required for utilization of the product. Foreign matter drops into a sump area in the dilution chamber, however, such foreign matter includes only those foreign particles too large or too heavy to be carried in the lime slurry (Col. 8, line 6). Thus Booth does not provide for removal of +10 to +100 mesh grit which would remain in the lime suspension exiting the device for use.

U.S. Pat. No. 4,261,953 (Gisler) is directed to a lime slaking apparatus, more particularly to a type of attrition machine to perform an attrition, scrubbing or abrading action on the lime particles being slaked so that new surfaces are exposed on the lime pellets so as to continue the reaction to completion. A plurality of cells are employed in which high-intensity rubbing and abrasion of the particles is provided to comminute the lime feed particles. Output of the slaking system is fed to the pool of a spiral classifier where larger lime particles including waste particles are separated and then conveyed to a ball mill for further comminution and to a screen separator for removal of waste material. Gisler states that use is made of a much higher than usual lime solids concentration but does not disclose actual values or whether the mixture is a paste or not.

In the removal of sulfur dioxide from power plant stack gas, certain scrubbing systems use a suspension comprising precipitated gypsum, calcium sulfite, and freshly slaked lime directly in the scrubber. For the system to be effective, the slaked lime slurry should be fresh, at a maximum solids concentration and as free of grit particles as possible. Also, a lime slurry made from highly reactive lime is more effective in removing the sulfur dioxide, possibly because the lime particles are smaller and thus have a greater surface area, which contributes to a faster reaction.

SUMMARY OF THE INVENTION

The properties desired in the slaked lime make the preparation of the slurry to meet these specifications more difficult than ordinary. A highly reactive lime almost always produces a viscous slurry at low to moderate solids concentrations (10-20%). Removal of grit in the range of +100 mesh size is made more difficult by the viscosity of the slurry. In most instances, gravity type classifiers cannot effect a removal of grit of this size range because the viscous slurries have Bingham-plastic characteristics. When at rest, the suspension behaves almost as if it were a semigelatinous solid, and even coarse particles will not settle out of the suspension, without the application of a significant amount of motion. Under conditions of high rate of movement, the apparent viscosity is greatly reduced, and separation of coarse particles can take place. These conditions are not produced, however, in the screw or rake type classifiers normally used with detention type slakers.

A further problem exists with the water balance in the scrubbing circuit. The normal operating practice in a gas scrubbing system results in a build up of soluble ions such as magnesium and sulfate in the liquid phase, and this liquor must be used for diluting the slaked lime. It is well known that sulfate ion in concentrations above about 1,000 ppm will adversely affect slaking, either preventing the reaction from occurring by coating the calcium oxide particles with gypsum, or producing a lumpy, partially slaked slurry which will not have the desired particle size distribution. Therefore, it is essential that the slaking reaction be virtually complete by the time the slaked slurry is contacted with the dilution liquor containing sulfate ion. Finally, the mixing of process liquor containing sulfate ion with the slurry will produce a precipitate of gypsum, and, due to its supersaturation properties, the liquor can cause severe scaling particularly in the scrubbing equipment such as spray nozzles. By allowing the gypsum reaction to become complete outside the slaking vessels, which would generally require 10-30 minutes detention time in the presence of a high proportion of gypsum solids, acting as seed material, the precipitation of gypsum scale on the scrubbing circuit piping, nozzles and other components is greatly reduced. Thus the scrubbing process used liquor is reacted in the classifier or other nonslaking vessel with a small amount of lime sufficient to ensure completion of the reaction. This predominantly gypsum slurry is situated in a vessel under suitable mixing conditions to allow the sulfate-containing used liquor solution to become de-supersaturated.

It is an object of this invention to provide a slaking and grit removal system that fulfills the above requirements. It is also an object of this invention to provide for a high degree of completion of slaking in the slaking means with a reduction of overall detention time and to minimize contact of incompletely slaked lime particles with dilution liquor containing appreciable amounts of sulfate ion. A further object is to provide for reduction of the apparent viscosity of the slaked lime slurry and to promote a rapid and efficient separation of coarse unwanted materials, sand, grit, coal and the like, hereinafter collectively called "grit" from the suspension. "Coarse" particles as used herein include particles of +100 mesh.

The above objects and other objects of this invention are attained by providing a vessel means for the slaking of lime with relative clean source water, such as from a municipal or lake supply, resulting in a slurry of relative high solids concentration (10%-20%). Multiple vessels or treatment steps ensure essentially complete reaction. The "pasty", rather high viscosity, slurry is then diluted in a mix tank with an upstream provided, counter-current diluent. The resultant more dilute slurry is then cyclonically treated to remove grit particles with the cyclone overflow providing a slaked lime slurry of a suitable viscosity, solids concentration and cleanliness (absence of grit) for use in the $SO_2$ scrubbing circuit. The cyclone underflow containing the grit passes to a classifier where it is diluted with scrubbing process water containing sulfate ion and wherein grit is separated, and sulfate ion in the process water removed by gypsum precipitation. Overflow from the classifier is used as the upstream counter-current diluent for the "pasty" slaked lime in the earlier step. Optionally, occluded lime particles on the grit which fall by gravity into the bottom of the classifier may be further comminuted and returned to upstream steps or parts of the system apparatus.

BRIEF DESCRIPTION OF THE DRAWINGS

The single FIGURE is a partially schematic illustration of a lime slaking system constructed and operable in accordance with the present invention.

DETAILED DESCRIPTION

The overall process and system of the invention is shown in the FIGURE wherein calcium oxide (CaO) is reacted with clean water, such as from a municipal or lake supply, in vessel means 10 containing a motor-driven propeller or turbine-type agitator 11. Typically vessel 10 is a cylindrical or square metal or wood tank of 9 foot height and a diameter of 12 feet. Agitator 11 may be a Mixing Equipment Co. Model 77Q30 having a 30 HP motor and 4 impeller blades and an impeller diameter of 68 inches revolving at 56 RPM to mix the forming slurry. This is a somewhat higher than normal mixer speed for lime slaking. The impeller blades are positioned in the range of 3 to 5 feet above the bottom of the vessel. The viscous nature of the slurry requires a larger than normal ratio of impeller diameter to tank diameter.

With respect to a particular lime tested, a 3 minute time is required for the slaking reaction to become complete. A 30 minute detention in a tank which is continuously fed and continuously discharged does not ensure complete reaction as a certain amount of entering solids will be discharged from the system within the next instant. This fraction escaping the system sooner than the necessary 3 minutes can be calculated mathematically, and, based on the type of reaction involved, the degree of completion of the slaking action can be predicted on this basis. It is estimated that for the conditions just described, the reaction would be about 90-95% complete in the slurry leaving the slaking compartment. However, by using the same total slaking time but using two tanks in series, the degree of completion will be increased to about 98%, because the amount of short-circuiting will have been reduced. Thus, to ensure near-complete slaking, two or more tanks in series should be used in order to maximize the percentage of lime which is slaked. Furthermore, by increasing the number of tanks, the overall detention time can be reduced and still maintain a high percentage of completion, as long as the total detention time is greater than the maximum time needed for the slaking reaction to occur.

For the above reasons it is most advantageous to provide a sequential second slaker vessel means 12 with a motor-driven agitator 13. Normally the tanks and agitators of each stage will be of similar size and performance but these parameters may vary with respect to the sought-for apparatus performance, and slurry characteristics. Suitable baffling may be used in the tanks to promote mixing and avoid dead spots. Overflow from vessel 10 enters or reports as the inlet feed into vessel 12.

For a typical lime slurry product and to ensure essentially complete (98%+) reaction of the lime feed, vessel 10 and 12 are operated with a water to lime feed ratio of from about 3:1 to 5:1. This results in a "pasty" viscous slurry having the behavior of a semigelatinous solid.

In order to obtain satisfactory and effective grit separation while retaining a relatively high, i.e., 14% to 20% solids concentration in the usable product, the viscosity of the slurry may be adjusted or the solids concentration lessened by dilution. The present invention uses both of these approaches, without compromising the final high solids concentration desired in the slaked lime suspension product. A dilution mix tank 14 is operably connected to the overflow 15 from vessel 12. Upstream counter-current diluent is provided through inlet 16 to provide the desired lower solids concentration, typically 14 to 20%. The "pasty" slurry and diluent are mixed by agitator 17. Diluted slurry is conveyed from tank 14 through outlet line 7 and conveyed by pump 18 to hydrocyclone 19. The hydrocyclone is used to carry out the primary grit removal. Slurry at the desired final solids concentration is pumped to the cyclone under moderately high pressure for example from 20 to 50 psi. The resultant high velocity conditions in the cyclone greatly reduce the apparent viscosity of the slurry and promote a rapid separation of the coarse grit particles and occluded large lime particles from the suspension. Certain operating characteristics of the cyclone such as diameter, the diameter and length of the vortex finder, the length of the cylindrical section, and the pressure drop across the cyclone can be varied as is known in the art in order to maximize the centrifugal force and improve the removal of coarse particles. The overflow from the cyclone is the useful product and in one application where the slaked lime is to be used in effluent gas scrubbing it is required to be at 18% solids concentration.

Dilution tank 14 is normally of lesser volume than the individual tanks 10 and 12. In a typical installation a cylindrical tank of 60 inches in diameter and 120 inches in height would be utilized. A smaller agitator similar in type and performance to those utilized in the slaker vessels may be employed in the dilution tank. Pump 18 may be a centrifugal pump such as an ASH PUMP Model 6×6, B frame manufactured by ASH PUMP, Paoli, PA. capable of pumping 38 tons (of solids) per hour at 18% solids. Cyclone 19 may typically be a 20 inch diameter Series 2000 WEMCLONE hydrocyclone manufacture by WEMCO/ENVIROTECH, Sacramento, Calif. Such a hydrocyclone maintains peak efficiency and assures satisfactory slurry/coarse particle separation. The diluted slurry is fed through inlet 20 into an involute feed inlet nozzle of the cyclone and then into the cylindrical body of the cyclone, producing mass rotation therein.

The centrifugal force generated causes the heaviest particles to migrate to the rim and down toward an apex outlet at the bottom of a cone depending from the cylindrical body, permitting discharge of coarser fractions. Finer or lighter fractions, more particularly the lime slurry useful product, at the interior of the revolving mass are forced inward and carried upward about an air core. The useful slurry is then skimmed by a vortex finder and passes through an overflow line 21 to discharge and use in the scrubber circuit equipment or to storage or further mixing with other scrubbants (not shown).

Underflow 22 including a minor amount of slaked lime slurry is conveyed to or drops into an inlet pool 23 of a classifier 24. Control of the operating parameters of the cyclone allow an amount of slaked lime slurry in the underflow. Classifier 24 is of a conventional type, used heretofore for lime slaking or removal of grit from industrial waste water or metallurgical or chemical processing streams. A spiral screw 25 conveys settled grit upwards along an inclined trough 26 to a grit discharge box 27. Settling of lime grit in a spiral-type classifier is best done at relatively low solids concentration of about 3 to 8% in the classifier pool.

In handling slaked lime slurries, there are certain other problems which include the presence of extremely coarse particles of grit, which can be as large as the coarsest size burned lime which is fed to the slaker. The coarse particles are discharged from the bottom apex of the cyclone, and will be accompanied by a certain volume of liquid, which in this case would be slaked lime slurry of the desired final solids concentration. In order to separate the grit from this residual lime slurry and remove the grit from the system, the suspension in the classifier pool must be relatively dilute of the order of 5% solids. Dilution liquor, which may be the process liquor from the $SO_2$ scrubbing circuit, enters the classifier at inlet 28, and is mixed with the cyclone underflow to produce the desired solids concentration, so as to promote rapid settling of the grit from the suspension. The grit-free slurry being continually formed in classifier 24 and which contains some residual slaked lime particles, overflows or is otherwise conveyed from an upper outlet or weir in classifier 24 by line 16 to dilute, in tank 14, the slaked lime slurry leaving the mix chamber of the slaker at a solids concentration of 25-30%, to produce the required feed to the cyclone. If the apex of the cyclone is too large, to much lime slurry will report with the grit, and the dilute conditions desired in the next separation stage would not be achieved. Therefore, operating conditions have to be selected carefully to balance effective grit removal with a minimum volume split to the underflow. Typically 10% of lime slurry to the cyclone underflow is utilized. Alternatively, a 2-stage cyclone system may be used to circumvent difficulties such as excess lime slurry entering the grit separation classifier. This could be the result of having to use a large diameter apex outlet to accommodate numerous, large, inert particles in the lime. However, this represents additional operating and investment cost and should be avoided if possible.

A problem in using spent process liquor containing sulfate as the dilution liquid is subsequent scaling of the scrubbing circuit equipment and a further increase in the pulp viscosity due to the formation of a fine gypsum precipitate. This is circumvented by means of this invention by various techniques. First, the cyclone apex volume split is controlled as much as possible to allow entry of the minimum amount of calcium hydroxide (slaked lime) suspension into the grit removal circuit so that all the sulfate can be precipitated completely in the classifier. Second, by minimizing the amount of solids in this suspension, the settling rate of the grit particles will be increased, which promotes their more effective removal. Third, with the predominant solids present in the classifier suspension being gypsum from the spent scrubbing liquor, the gypsum serves as a seed material for the remaining soluble but super-saturated gypsum in solution, which will preferably precipitate on a surface having identical characteristics. The result will be a more stable desulfurized diluent solution entering the pumping and cyclone circuit and ultimately into the slaked lime storage system, resulting in less scaling and required cleaning in that system. Gypsum precipitation occurs in classifier 24 where any scaling can more easily be taken care of by periodic cleaning. Further, the spiral itself tends to scrape scale deposited in the incline trough and convey it to ultimate discharge.

An optional addition to the system and method is also seen in the FIGURE. It may be necessary to recover useful calcium hydroxide particles which are agglomerated during the precipitation of calcium sulfate or for other reason report from the cyclone with the grit fraction. These lime-containing particles are much softer than grit particles, but nonetheless are of such size and specific gravity that they will behave as grit and be contained in the dewatered solids fraction discharged from the screw classifier into grit discharge box 27. This material may be conveyed by a conveyor 29 and mixed or "mulled" in a device such as an attrition machine 30 which simply rubs particles against one another to loosen and release soft material associated with hard particles. A typical example of such machine is seen in U.S. Pat. No. 3,054,230. Subsequently, the resultant suspension can be rediluted with lake or process water from inlet 31 in a second classifier 32 and the recovered lime slurry recycled back through line 33 to the slaker 10 or classifier 24. This approach may be used if the value of the recovered lime justifies the additional capital expenditure. It should be pointed out that simple attrition of the entire slaked lime slurry is not apt to produce the same result, since the preponderance of fine particles and the viscosity of the slurry "lubricates" the suspension and greatly reduces the necessary grinding or attrition of the semisoft particles, one against another.

The following example illustrates the process of this invention. 22.5 tons/hour of CaO are mixed with 94.5 tons/hour of lake water. This is a water:lime ratio of 4.2 which provided a viscous pasty slurry, the fluidity of which allows proper mixing to occur. Since the slaked slurry will be diluted with a spent process liquor containing some residual sulfate ion, it is probable that particles that are not completely slaked when they leave the actual slaking compartment will, upon contact with the process liquor, become coated with a gypsum precipitate. This would, in effect, cause the reaction to cease, and the material to behave as if it were grit. Thus, to avoid a significant loss of unreacted material from the slaking circuit, a 2-stage slaking step is seen in the FIGURE providing a total retention time of about 30 minutes. This will raise the degree of reaction completion from about 95% to near 99%, based on the reaction times observed.

As is known, the slaking reaction temperatures due to the exothermic nature of the reaction must be controlled. Higher temperatures result in more viscous pulps. The reaction of calcium oxide with water (slaking) is a relatively simple process which, however, requires certain conditions for optimum results. It is a heterogeneous reaction, and for it to proceed at a reasonable rate, particularly with the coarse particle size of the lime, it is necessary to obtain sufficient agitation to contact both the solid and liquid phases. If this is achieved, then rate of reaction will be governed by the activity of the lime, which is largely a function of the kiln conditions during its manufacture. While one might infer that this is a second order reaction because it is bimolecular, this is unlikely to be the case because of the excess of water present. In actuality, this may behave as a first order or even complex order reaction.

Removal of the grit from the diluted slaked lime slurry is an operation which is aptly described by the mathematics of Stokes' law:

$$\text{Particle settling velocity (terminal)} = \frac{g\, D_p^2\, (\Delta \text{ specific gravity})}{18\mu}$$

Where $D_p$ is the particle diameter and $\mu$ is the liquid viscosity. For particles in the size range which will be removed (+100 mesh) the "intermediate law" may apply, and this predicts a somewhat lower terminal settling rate than Stokes' law. A number of useful references may be consulted for further information in this field: Perry's "Chemical Engineers Handbook"; Taggart's "Handbook of Mineral Dressing".

The factor of viscosity, as used in Stokes' law, is somewhat unique in this slaking application in that it is extremely high and of a pseudo-plastic character which prohibits precise theoretical calculations of results that can be expected in dynamic regimes. Most slurries exhibit this behavior, and the difference is that the apparent viscosity of a pulp is a function of the velocity of the measuring device. While a plot of shear stress as a function of shear rate on logarithmic coordinates will yield a straight line with a slope of one with a Newtonian fluid, it will have a lesser slope with the pseudo-plastic materials, indicating the variation of viscosity with shear rate. The significance of this is that classifying devices which operate at relatively high velocity, such as cyclones and centrifuges, will produce conditions more favorable to settling of the coarser solids, by reducing the effective viscosity of the slurry. Machines which depend essentially on gravity settling, such as hydroseparators, spiral or rake classifiers, and similar units will experience the maximum viscosity the pulp can produce. The argument can be advanced that there is motion in these units, which will reduce the viscosity. However, the degree of motion is minor, and its effect would be primarily to prevent or overcome the gelling effect of certain slurries which tend to set up when stagnant.

Through the slaking step(s) 29.73 tons/hour of slaked lime and 87.27 tons/hour of water are diluted with 1.57 tons/hour of recycled slaked lime and 55.33 tons/hour of water in the form of upstream counter-current diluent and then cyclonically or otherwise separated by centrifugal action into a usable fraction and a coarse, mainly grit, fraction in the subsequent next step.

An 18% solids overflow product is provided from the cyclonic separation step containing 29.73 tons/hour slaked lime and 135.47 tons/hour water. Underflow from this step contains 1.57 tons/hour of slaked lime and an additional, variable amount of grit and 7.13 tons/hour of water. In the subsequent classifying step 48.2 tons/hour of spent scrubbing process water plus make-up water compensating for that leaving with the grit discharge 27 is fed into the classifier.

Because of the particle size of the reacted lime solids, there is little or no concentration of this fraction, and the solids would simply follow the liquid phase. Therefore, the total solids concentration in the cyclone underflow, exclusive of the grit material, would be approximately 18%. This slurry will be diluted with a spent liquor containing as much as 21,000 ppm sulfate. This amount of sulfate requires approximately 0.8 tons of calcium hydroxide solids for complete conversion to gypsum, hence there will be sufficient amount of calcium hydroxide present in the cyclone underflow (1.57 T/hour) entering the classifier pool so that the sulfate will all be precipitated in the classifier 24.

The resulting suspended solids concentration of precipitated gypsum and calcium hydroxide will amount to approximately 5% by weight of the total suspension entering the dewatering classifier. Tests which were performed on a suspension at this dilution indicated that a 100 mesh particle would settle out readily in the area available in a unit corresponding to a No. 12 size KCS slaker classifier available from Eimco Process Equip. Company. Therefore, this slaker classifier, in combination with the mixing tanks 10 and 12, provides both the necessary slaking time of 30 minutes and sufficient area for dewatering of the grit, once the latter has been separated from the main process stream. The retention time in the classification compartment will amount to from 10 to 30 minutes, and allow the gypsum reaction to become nearly complete, thus reducing the potential for scaling in the pump, cyclone and scrubbing circuits. Finally, the overflow from the classifier will flow directly to a pump sump or flow by gravity to be the diluent for the slaked lime. Any stray oversize particles contained in this overflow will be recovered by the cyclone on the next pass.

The above description of advantages and embodiments of this invention is intended to be illustrative and not limiting. Other embodiments of this invention will be apparent to those skilled in the art in view of the above disclosure.

I claim:

1. A lime slaking system for hydration of lime and removal of unwanted grit particles comprising:
   (a) vessel means for containing unhydrated lime particles, coarse grit particles and water;
   (b) means in said vessel means for mixing unhydrated lime particles and water so as to react said lime particles to form calcium hydroxide;
   (c) a dilution mix tank operably connected to an outlet of said vessel means;
   (d) a cyclone operably connected to an output from said dilution mix tank;
   (e) said cyclone having an overflow outlet for a light overflow fraction comprising useful slaked lime product and an underflow outlet for an underflow fraction comprising coarse grit particles;
   (f) a classifier means operably connected in flow communication with said cyclone underflow outlet, including means for feeding cyclone underflow material to a pool in said classifier means;
   (g) means for feeding dilution water into said classifier means; and
   (h) means for transporting water overflow from said classifier means to said dilution mix tank.

2. The system set forth in claim 1 in which said vessel means comprises at least two slaker vessels in sequential operable connection.

3. The system set forth in claim 1 wherein said classifier means includes a rotary inclined spiral to remove grit particles.

4. The system set forth in claim 1 further comprising an attrition machine operably connected to a grit discharge portion of said classifier means for comminuting any occluded particles of lime exiting from said classifier means grit discharge portion and means for separatinag comminuted particles of lime from unwanted grit particles.

5. The system set forth in claim 4 further including means to recycle said comminuted lime particles to said vessel means or said classifier means.

6. A lime slaking system for hydration of lime and removal of included grit materials comprising:
   (a) mixer means for mixing unhydrated lime particles, grit particles and water to form a calcium hydroxide/grit slurry; a slurry outlet extending from said mixer means;
   (b) means for diluting said slurry, said slurry outlet being in flow communication with at least a portion of said means for diluting;
   (c) cyclone means connected in flow communication with said portion of said means for diluting for separating in said cyclone means said diluted slurry into a calcium hydroxide slaked lime fraction and a grit particles fraction; said cyclone means including a first outlet for said slaked lime fraction and a second outlet for said grit particles fraction; and
   (d) classifier means connected in flow communication with said cyclone means second outlet for removing grit particles from said slurry;
   (e) means for adding upstream process liquor diluent to said classifier means; and
   (f) means for conveying to said means for diluting a grit-free slurry formed in said classifier means and including said upstream process diluent liquor added to said classifier means.

7. The system of claim 6 further comprising means for communiting said grit particles entering from said classifier means to release calcium hydroxide particles reporting with said grit particles and means for returning released calcium hydroxide particles to said means for mixing or said classifier means.

8. A lime slaking system for hydration of lime and removal of included grit materials comprising:
   (a) mixer means for mixing unhydrated lime particles, grit particles and water to form a calcium hydroxide/grit slurry; a slurry outlet extending from said mixer means;
   (b) means for diluting said slurry, said slurry outlet being in flow communication with at least a portion of said means for diluting;
   (c) cyclone means connected in flow communication with said portion of said means for diluting for separating in said cyclone means said diluted slurry into a calcium hydroxide slaked lime fraction and a grit particles fraction; said cyclone means including a first outlet for slaked lime fraction and a second outlet for said grit particles fraction; and
   (d) classifier means connected in flow communication with said cyclone means second outlet for removing grit particles from said slurry;
   (e) means for feeding process water into said classifier means; and
   (f) means for transporting overflow from said classifier means into an inlet in said means for diluting.

* * * * *

UNITED STATES PATENT AND TRADEMARK OFFICE
CERTIFICATE OF CORRECTION

PATENT NO. : 4,588,559
DATED : May 13, 1986
INVENTOR(S) : Robert C. Emmett

It is certified that error appears in the above-identified patent and that said Letters Patent is hereby corrected as shown below:

Column 9, lines 43-44 delete "separatinag" and insert --separating--.
Column 10, line 43, delete "for slaked" and insert --for said slaked--.

Signed and Sealed this

Nineteenth Day of August 1986

[SEAL]

Attest:

DONALD J. QUIGG

Attesting Officer

Commissioner of Patents and Trademarks